United States Patent [19]

Gorman et al.

[11] Patent Number: 4,768,918
[45] Date of Patent: Sep. 6, 1988

[54] INDUSTRIAL ROBOT HAVING COUNTERBALANCED ARMS

[75] Inventors: Robert H. Gorman, Clinton; Ram N. Aggarwal, Allison Park, both of Pa.

[73] Assignee: American Cimflex Corporation, Pittsburgh, Pa.

[21] Appl. No.: 874,233

[22] Filed: Jun. 13, 1986

[51] Int. Cl.⁴ .............................................. B25J 11/00
[52] U.S. Cl. ........................................ 414/719; 901/48; 74/592
[58] Field of Search ........................... 414/719; 901/48; 74/589, 592; 248/625; 267/155, 177, 277

[56] References Cited

U.S. PATENT DOCUMENTS

| | | | |
|---|---|---|---|
| 2,916,082 | 12/1959 | Wilkinson et al. | 248/625 X |
| 3,391,804 | 7/1968 | Flatau | 414/680 |
| 3,608,743 | 9/1971 | Mosher et al. | 414/5 |
| 4,024,961 | 5/1977 | Stolpe | 414/729 |
| 4,259,876 | 4/1981 | Belyanin et al. | 74/469 |
| 4,277,044 | 7/1981 | Hamilton | 248/571 |
| 4,283,165 | 8/1981 | Vertut | 414/733 |
| 4,500,251 | 2/1985 | Kiryu et al. | 414/719 |
| 4,537,233 | 8/1985 | Vroonland et al. | 267/155 X |
| 4,546,233 | 10/1985 | Yasuoka | 414/719 X |
| 4,552,505 | 11/1985 | Gorman | 414/735 |
| 4,620,829 | 11/1986 | Herve | 414/720 |
| 4,659,280 | 4/1987 | Akeel | 901/48 X |

Primary Examiner—Robert J. Spar
Assistant Examiner—Donald W. Underwood
Attorney, Agent, or Firm—Bell, Seltzer, Park & Gibson

[57] ABSTRACT

An industrial robot is disclosed which includes three primary drive units defining three separately controlled axes of movements, an inner arm connected to the output of one of the drive units, and an outer arm pivotally connected to the inner arm. The outer arm is connected to another of the drive units by a transmission which extends through the inner arm so that the outer arm may be selectively rotated, and both the inner arm and the outer arm are counterbalanced by a pair of torsion coil springs which are operatively connected to their respective drive units.

8 Claims, 6 Drawing Sheets

INDUSTRIAL ROBOT HAVING COUNTERBALANCED ARMS

The present invention relates to an industrial robot of the type designed as a replacement for human labor in performing repetitive, hazardous, or tiring work.

Industrial robots generally have the capability of moving through up to six axes of movement to manipulate objects, parts, or tools through variable programmed motions for the performance of a variety of tasks. Reprogrammable robots are also available which incorporate a computer and microprocessor whereby the robot may be taught to move from point to point using a portable teaching box or the like.

Industrial robots of the type adapted to move through a large number of axes commonly include a primary support member which includes at least two drive units, an inner arm connected to the output of one of the drive units so as to rotate about a horizontal central axis, and an outer arm which is pivotally connected to the inner arm for rotation about a second horizontal axis disposed parallel to and laterally spaced from the central axis. Also, a suitable transmission is provided which extends through the inner arm for operatively interconnecting the outer arm with the second one of the drive units, so that the second drive unit rotates the outer arm about the second axis. Robots of this general type are disclosed for example in commonly-owned U.S. Pat. No. 4,552,505 and copending application Ser. No. 443,156, now U.S. Pat. No. 4,636,138.

As will be apparent, rotation of one of the arms from a substantially vertical position to a horizontal position results in the weight of the arm, or the weight of the workpiece at the end of the arm, imparting a significant torque to its mounting structure, which results in a strain being placed on the mounting structure and an additional load being imparted to the drive motor. Heretofore, counterbalancing weights have been mounted on the arms to alleviate this problem, but such weights increase the load on the drive motor, they are necessarily massive and require a great deal of space, and they are not readily adjustable to accommodate different arm or workpiece weights. It has also been proposed to utilize a tension spring for counterbalancing the arm of a robot, note for example U.S. Pat. No. 4,500,251, but this prior spring counterbalancing system is seen to require a great deal of space and it is not readily adjustable.

It is accordingly an object of the present invention to provide an industrial robot having provision for effectively counterbalancing its movable arms, and which avoids the disadvantages and limitations of the prior systems.

It is a more particular object of the present invention to provide an industrial robot having inner and outer pivotally interconnected arms, and which includes an effective system for counterbalancing each of the arms with a readily adjustable counterbalancing force.

These and other objects and advantages of the present invention are achieved in the embodiment illustrated herein by the provision of an industrial robot which comprises a support member, a reversible drive unit mounted to the support member and including rotatable output shaft means, and an arm connected to the output shaft means of the drive unit so as to be rotatable about a horizontal axis at least between a vertically disposed position and a horizontally disposed position by operation of the drive unit. Torsion spring means is also provided for applying a torque to the output shaft means in an amount which is a function of the rotational positioning of the arm and such that a minimum torque is applied when the arm is vertically disposed and a maximum torque is applied when the arm is horizontally disposed and so as to effectively counterbalance the weight of the arm. The torsion spring means includes a coil spring having a plurality of windings and first and second opposite ends, means operatively interconnecting the first end of the coil spring to the support member, and means operatively connecting the second end of the coil spring to the output shaft means of the drive unit, such that rotation of the output shaft means causes the coil spring to rotate so as to either tighten or loosen the windings.

In a preferred embodiment, the industrial robot includes two drive units which are mounted to a common support member, and with the drive units including coaxially disposed output shaft means disposed along the central axis. An inner arm is connected to the output shaft means of a first drive unit, and an outer arm is pivotally connected to the inner arm for relative rotation about a second axis which is disposed parallel to and laterally spaced from the central axis. Torque transmission means is provided for connecting the output shaft means of the second drive unit to the outer arm, and such that the outer arm may be rotated about the second axis by the second drive unit. In addition, first and second torsion spring means are provided, with the first torsion spring means being operatively connected to the output shaft means of the first drive unit, and the second torsion spring means being operatively connected to the output shaft means of the second drive unit. Each of the first and second torsion spring means comprises a coil spring as described above, and the two coil springs are preferably mounted along parallel axes, which are parallel to the central axis of the robot.

Some of the objects and advantages having been stated, others will appear as the description proceeds, when taken in conjunction with the accompanying drawings, in which.

Figures 1, 2, 3:
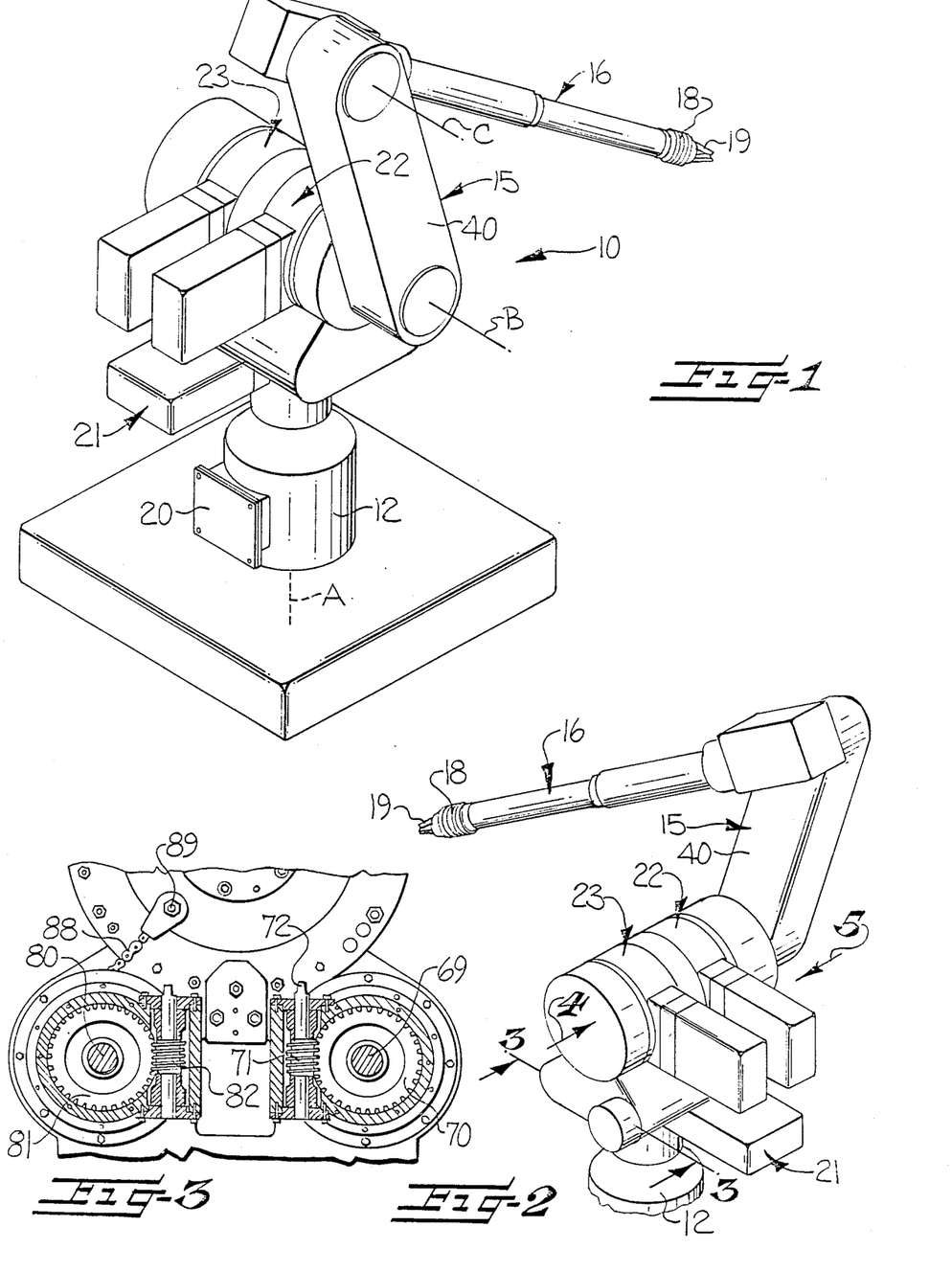
FIG. 1 is a perspective view of an industrial robot which embodies the present invention.
FIG. 2 is a perspective view of the robot shown in FIG. 1 taken from the opposite side.
FIG. 3 is a fragmentary sectional end view taken substantially along the line 3—3 of FIG. 2.

Referring more particularly to the drawings, an industrial robot embodying the features of the present invention is illustrated generally at 10. In the illustrated embodiment, the robot 10 is adapted to move through six axes of movement, and it comprises a primary support stand 12 which defines a generally vertical axis A (FIG. 1). A waist 14 is rotatable with respect to the stand 12 and defines a generally horizontal axis B which is perpendicular to and intersects the axis A. A first or inner arm 15 is rotatable with respect to the waist 14 about the horizontal axis B, and a second or outer arm 16 is rotatable with respect to the inner arm about a second horizontal axis C, which is parallel to and laterally spaced from the axis B. A hand assembly 18 including a gripper 19 is mounted at one end of the outer arm 16, and is adapted to move through three additional axes of movement, in the manner further described in copending application Ser. No. 443,156. In addition, the support stand 12 of the robot mounts a control box 20 mounted adjacent the stand 13 for housing the electronic controls for the various drive motors of the robot.

Figure 6:
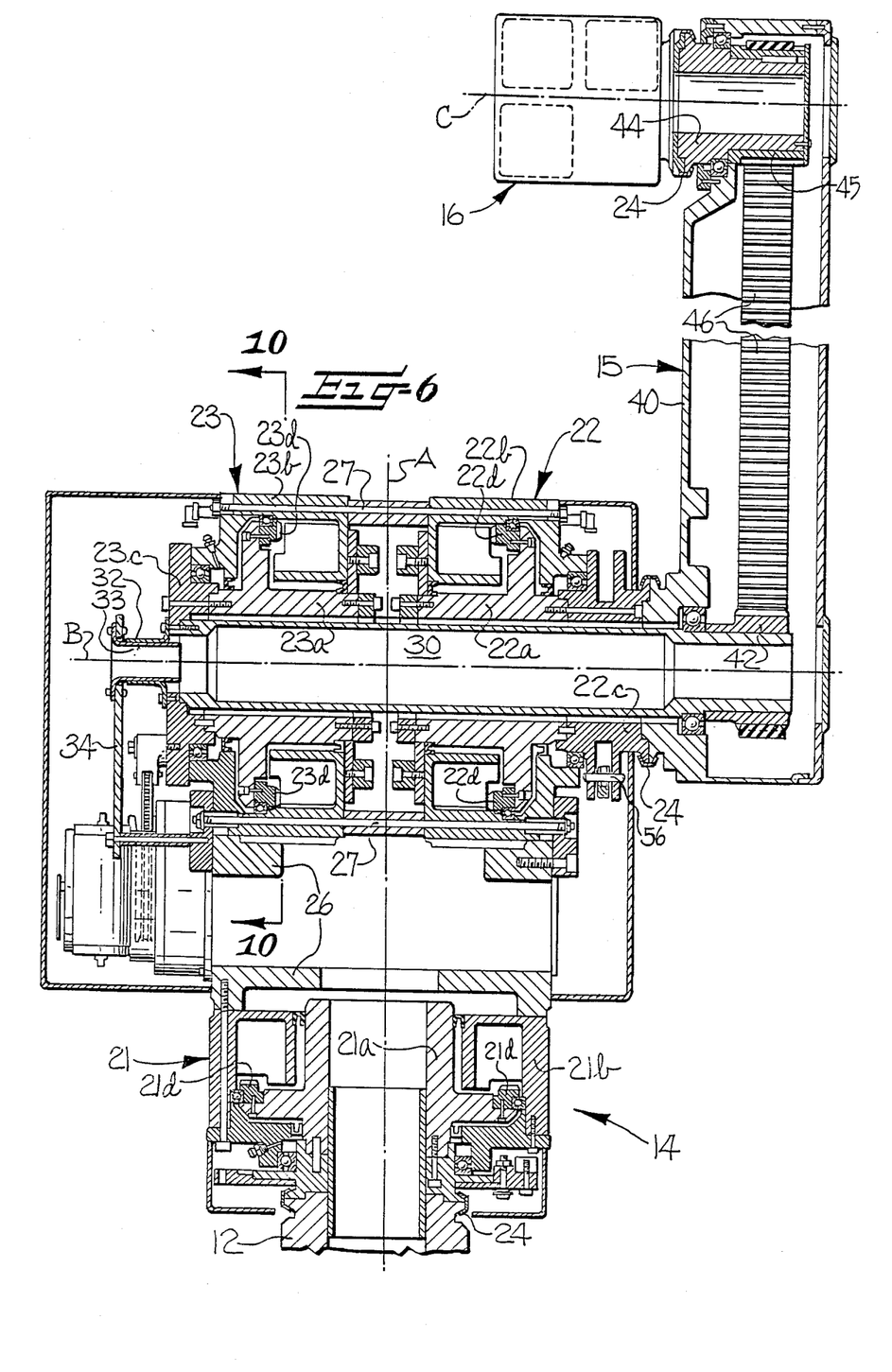
FIG. 6 is a sectional side elevation view taken substantially along the line 6—6 of FIG. 5.

As best seen in FIG. 6, the robot includes a drive unit 21 having a tubular base component 21a and a secondary component 21b which is rotatable with respect to the base component about the axis A. The base component 21a is fixedly connected to the support stand 12 by a releasable coupling band 24 as further described in copending application Ser. No. 443,156.

A support member 26 is fixed to the secondary component 21b of the drive unit 21, and the support member 26 in turn mounts a pair of drive units 22 and 23. The drive units 22 and 23 each include a tubular base component 22a, 23a, which are coaxially disposed about the axis B, and a surrounding secondary component 22b, 23b. The secondary components 22b, 23b, are fixed to each other by bolts 27, and fixed by bolts to the support member 26, and the tubular base components 22a, 23a are rotatably mounted to their respective secondary components so as to rotate about the axis B.

The drive unit 22 includes output shaft means which includes a crank arm 22c (FIG. 5) fixed to the end of the tubular base component 22a by bolts. The crank arm 22c is coaxially mounted about the axis B and it is in turn coupled to the casing of the inner arm 15 by a coupling band 24 of the type described above.

The drive unit 23 includes output shaft means which includes a crank arm 23c (FIG. 4) which is bolted to the outer end of the base component 23a. Also an elongate drive shaft 30 is fixed to the crank sleeve 23c and extends coaxially through the base component 23a of the drive unit 23, and also through the base component 22a and crank arm 22c of the drive unit 22. A tubular sleeve 32 is coaxially fixed to the end of the crank arm 23c, and the sleeve closely surrounds and supports a cable guide tube 33. The guide tube is fixed to the support member 26 by the brace 34, and such that the sleeve 32 is rotatable about the fixed guide tube 33. The guide tube is designed to facilitate the passage of electrical or other cables through the drive shaft 30 and into the inner arm 15, for driving the components of the outer arm 16.

Figures 10, 11, 12:
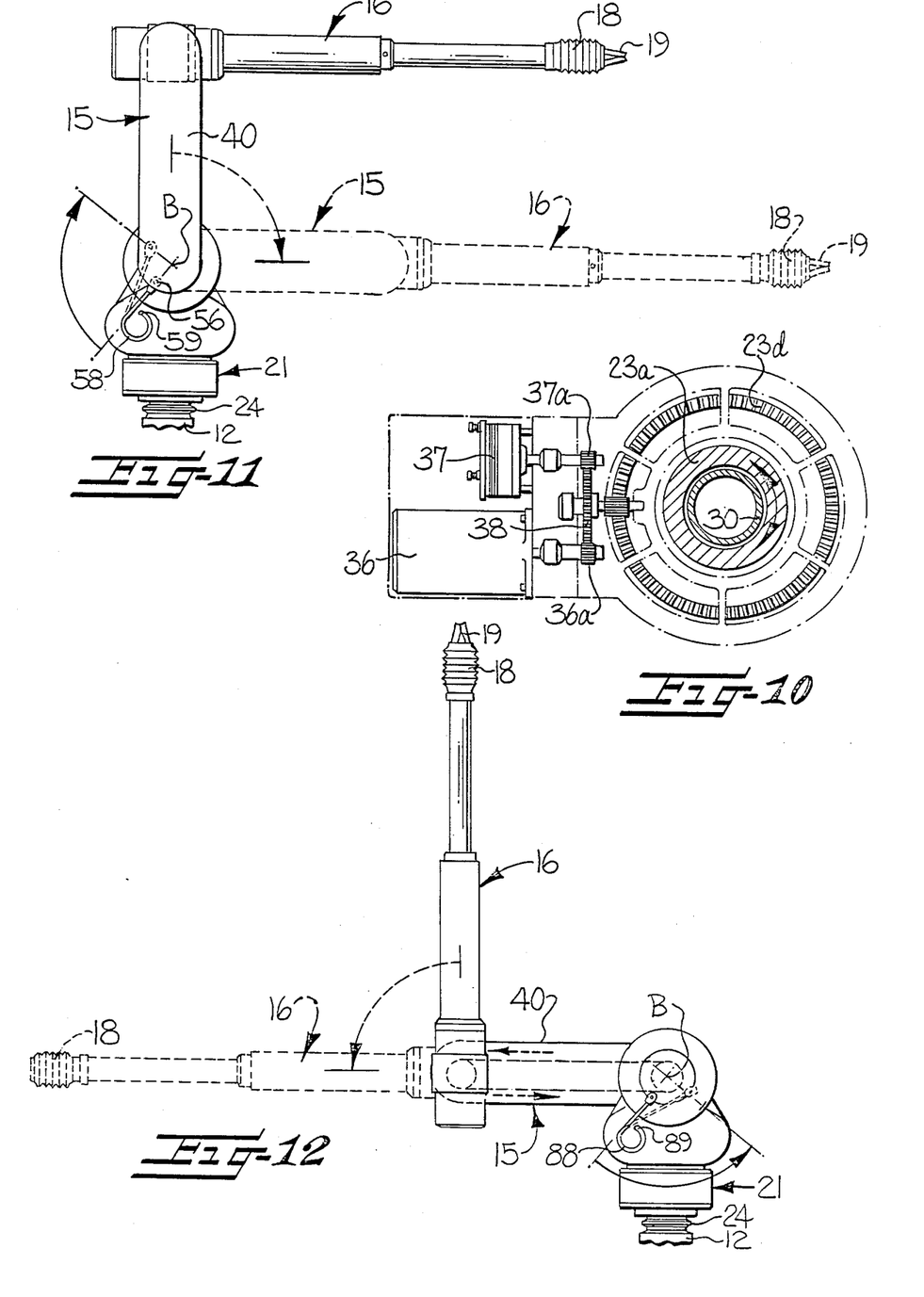
FIG. 10 is a fragmentary sectional view taken substantially along the line 10—10 of FIG. 6.
FIGS. 11 and 12 are end elevation views of respective opposite ends of the robot, and illustrating the manner in which the arms are variably counterbalanced in various positions of the arms.

Each of the three drive units 21, 22, 23 includes a face gear 21d, 22d, 23d respectively, which is coaxially mounted to the base component thereof, and a reversible drive motor 36 and brake 37 which are mounted to the exterior of the associated secondary component for rotatably driving the face gear. As best seen in FIG. 10, which is representative of all three drive units, the motor 36 and brake 37 each include an output shaft mounting a drive gear 36a, 37a, and the two drive gears engage a pinion gear 38 which in turn meshes with the face gear 21d to effect rotation of the face gear and base component in a selected rotational direction. However, in the case of the drive unit 21, it will be understood that it is the secondary component 21b which actually rotates about the fixed base component 21a. Alternatively, a drive unit may be employed which comprises a rotor and stator which are both coaxially disposed about the rotational axis of the motor, and as further described in U.S. Pat. No. 4,552,505.

The inner arm 15 of the robot comprises a casing 40, having one end which is releasably connected to the crank arm 22c as described above. Thus the inner arm may be selectively rotated in either direction about the axis B by the drive unit 22. Also, the shaft 30 from the drive unit 23 extends coaxially into the casing 40 and mounts a sprocket 42 at the free end thereof. A second shaft 44 is rotatably mounted at the other end of the casing 40, and is disposed coaxially about the horizontal axis C, which is parallel to and laterally spaced from the horizontal axis B. The shaft 44 is directly joined to the casing of the outer arm 16 by a coupler 24, and the shaft 44 coaxially mounts a sprocket 45 within the casing 40 of the inner arm. A flexible endless toothed belt 46 is operatively entrained about the sprockets 42, 45. By this arrangement, a transmission is defined which includes the drive shaft 30, sprockets 42, 45, and belt 46, which interconnects the base component 23a of the drive unit 23 with the outer arm 16, so that the outer arm may be selectively rotated in either direction about the axis C by the drive unit 23. Also, since the support member 26 is fixed to the secondary component 21b of the drive unit 21, it will be apparent that the rotation of the secondary component 21b results in the support member 26, drive units 22, 23, and inner and outer arms 15, 16 all rotating about the vertical axis A.

Figure 7:
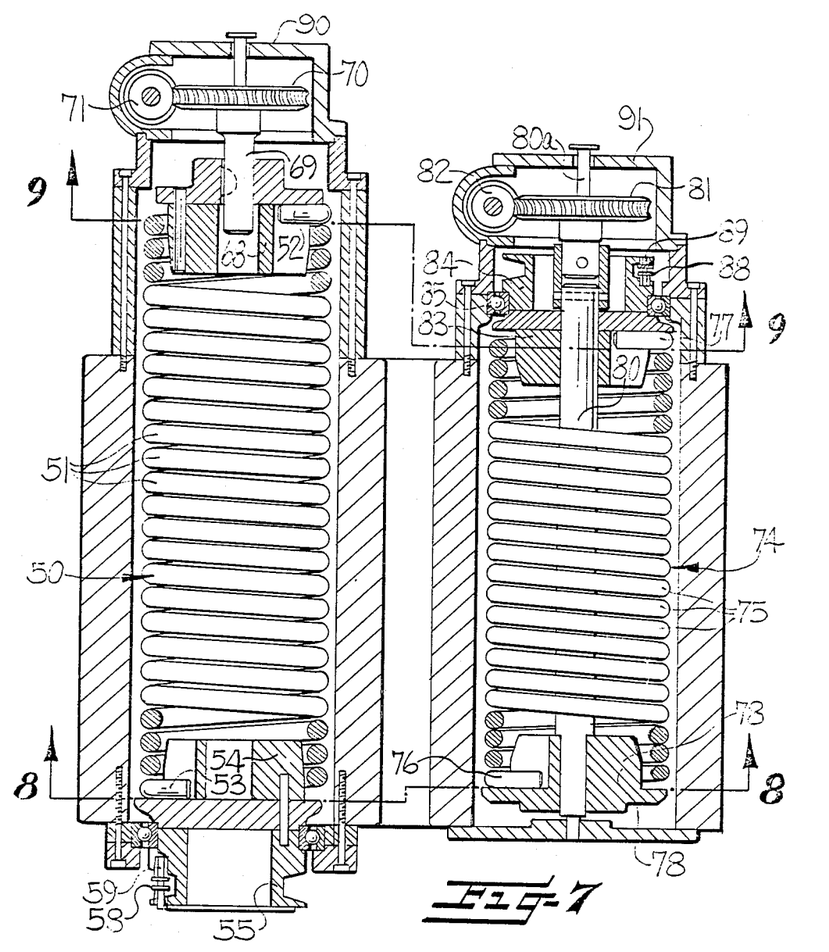
FIG. 7 is a sectional top plan view taken substantially along the line 7—7 of FIG. 5.
Figure 8:
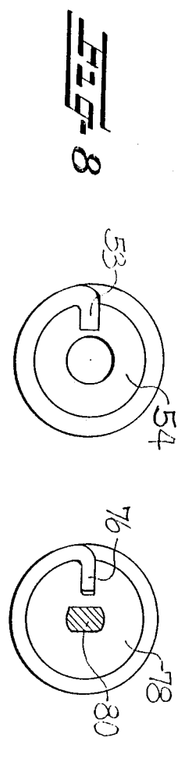
FIG. 8 is a fragmentary sectional end view taken substantially along the line 8—8 of FIG. 7.
Figure 9:
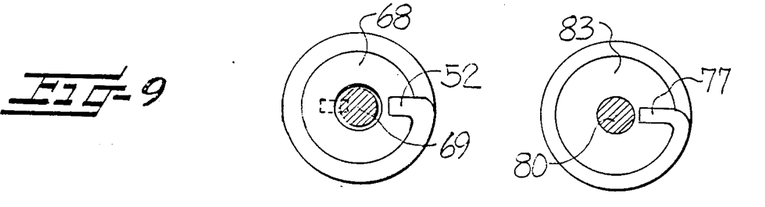
FIG. 9 is a fragmentary sectional end view taken substantially along the line 9—9 of FIG. 7.

The industrial robot 10 further includes first torsion spring means operatively connected to the output shaft of the drive unit 22, and second torsion spring means operatively connected to the output shaft of the drive unit 23. More particularly, and as best seen in FIG. 7, the first torsion spring means includes a first coil spring 50 which is disposed along a horizontal axis which is parallel to the central axis B, and the first coil spring 50 includes a plurality of windings 51 and first and second ends 52, 53 respectively. The first end 52 is fixedly interconnected to the support member by the structure described below, and the second end 53 is connected to the crank arm 22c of the drive unit 22 such that rotation of the output shaft means of the drive unit 22 causes the second end 53 of the coil spring 50 to rotate upon its axis, and while the first end 52 is held against rotation. Thus the windings 51 of the coil spring 50 are either tightened or loosened. More particularly, the second end 53 is interconnected to the crank arm 22c by an arrangement which includes an end flange 54 which receives and supports the end 53 of the coil spring as best seen in FIG. 8, and a pulley 55 which is fixed to the end flange and rotatably mounted to the support member by bearings 56. Also, the mounting arrangement includes a mounting pin 56 on the crank arm 22c at a location radially spaced from the central axis B, and a cable or chain 58 which has one end wrapped upon the pulley 55 and fixed thereto by a pin 59, and an opposite end which is fixed to the mounting pin 56 of the crank arm 22c.

Figure 4:
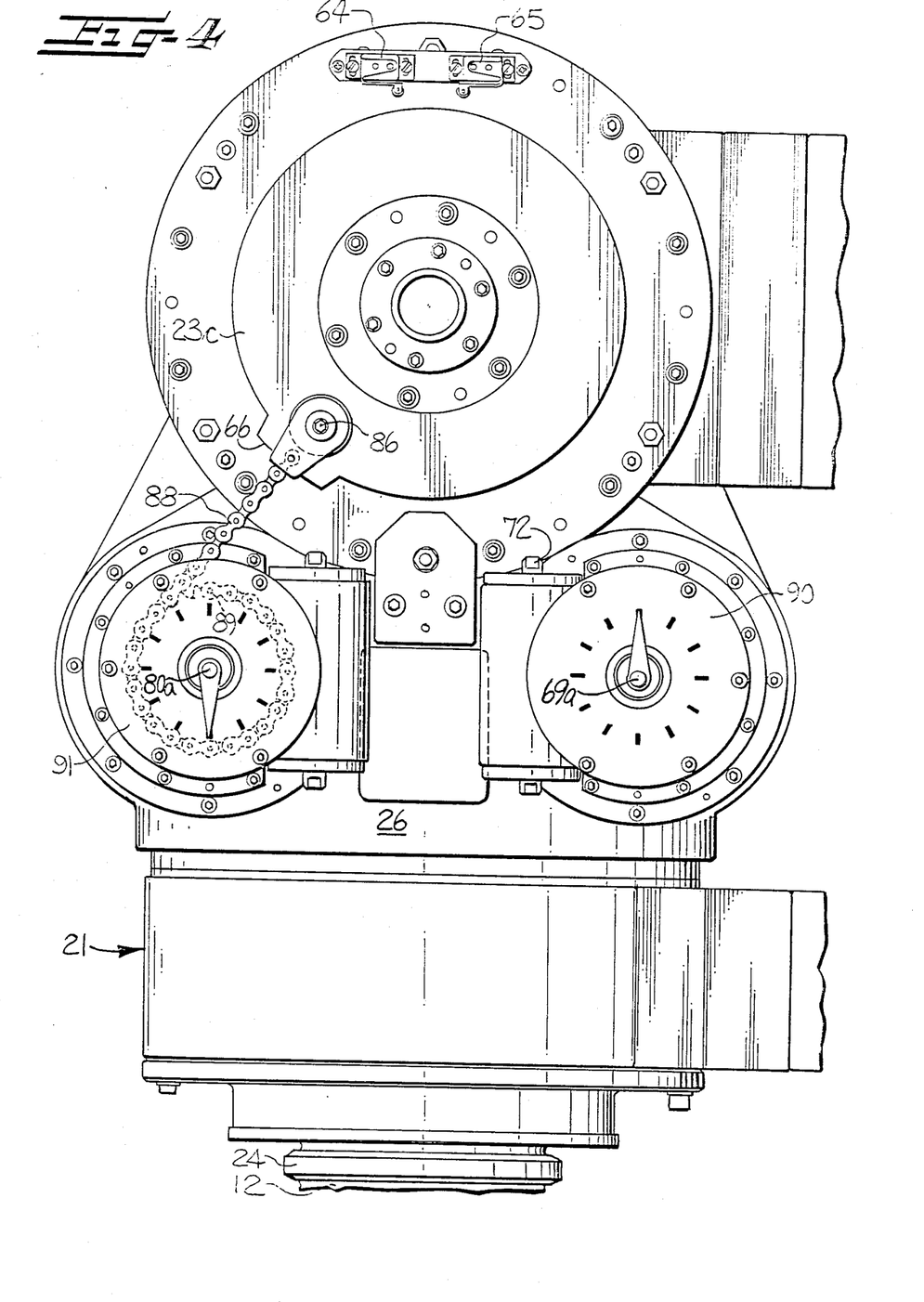
FIG. 4 is a fragmentary end elevation view of the robot taken in the direction of the arrow 4 in FIG. 2, and with the protective cover removed.
Figure 5:
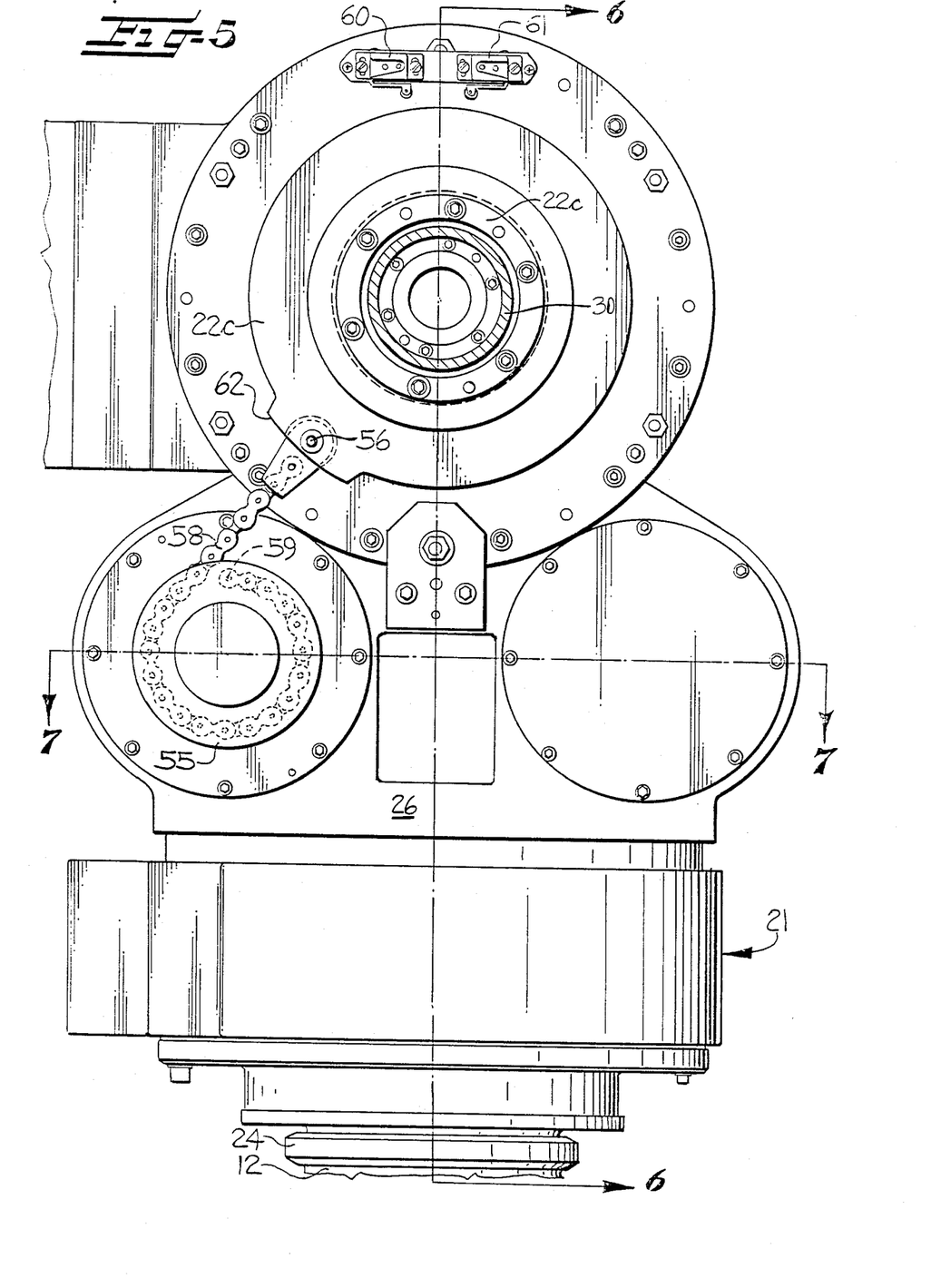
FIG. 5 is a fragmentary and partly sectioned end elevation view taken from the end opposite that of the FIG. 4 and in the direction of the arrow 5 in FIG. 2.

As best seen in FIG. 5, the secondary component 22b of the drive unit 22 mounts a pair of limit switches 60, 61, and the crank arm 22c includes a raised cam surface 62 which is designed to engage respective ones of the limit switches. This arrangement prevents the base component 22a and crank arm 22c from rotating beyond its maximum designed range, which is typically about 350°. A corresponding pair of limit switches 64, 65 are mounted on the secondary component 23b of the drive unit 23, note FIG. 4, which are engaged by the raised cam surface 66 on the crank arm 23c.

The first end 52 of the coil spring 50 is fixed to an end flange 68 (note FIGS. 7 and 8), and the end flange 68 is fixedly mounted to a support shaft 69, which extends along the axis of the coil spring 50. A gear 70 is in turn coaxially mounted to the shaft 69. A worm 71 is rotatably mounted to the support member so as to operatively engage the gear 70, and the worm 71 includes a head 72 as best seen in FIGS. 3 and 4, which is adapted to be engaged by a suitable turning tool so that the associated gear 70, and thus the first end 52 of the coil spring 50, may be selectively rotated.

The second torsion spring means, and which is operatively connected to the output shaft of the drive unit 23, comprises a second coil spring 74 which is disposed along a horizontal axis which is parallel to that of the first spring 50, and the second spring comprises a plurality of windings 75 and first and second ends 76, 77 respectively. The first end 76 is fixedly interconnected to the support member 26 by means of an end flange 78, which in turn is fixed to a shaft 80 which extends coaxially through the spring 74. The opposite end of the shaft 80 mounts a gear 81, which may be selectively rotated by the worm 82 in the manner described above with respect to the gear 70 and worm 71. The second end 77 of the spring 74 is connected to the crank arm 23c of the drive unit 23, such that rotation of the output shaft means of the drive unit 23 causes the second end 77 to rotate. This interconnection includes an end flange 83 which receives and supports the end 77 of the spring 74, and a pulley 84 which is fixed to the end flange 83 and rotatably mounted to the support member by bearings 85. Also, there is provided a mounting pin 86 on the crank arm 23c at a location radially spaced from the central axis B, and a chain 88 which has one end wrapped upon the pulley and fixed thereto by a pin 89, and an opposite end which is fixed to the mounting pin 86 of the crank arm 23c.

The above described mounting arrangement of the two coil springs 50, 74 results in the first end of each coil spring being fixed to the support member and held against rotation, but the first end may be selectively rotated by rotation of the worm to thereby either wind or unwind the coil spring and thereby adjust the torque imparted to the associated drive unit. Such adjustment permits the applied torque to be readily and easily changed where the weight of the arm, or the weight of the workpiece being manipulated, changes.

As best seen in FIG. 7, the first and second ends of the two coil springs are oppositely oriented so that one chain is positioned on each side of the robot, but the worms 71, 82 for the adjustment of the two coil springs 50, 74 are positioned on a common side of the robot, which is opposite the inner and outer arms, to facilitate access by a technician. Also, a cover plate 90, 91 (FIG. 4) is mounted at the end of each coil spring which mounts the gear and worm, and a mounting post 69a, 80a extends coaxially from the associated shaft through the cover plate, and the post in turn mounts a dial 92 which is positioned on the external side of the cover plate. Each cover plate also includes suitable external indicia, by which the adjusted torsion of each coil spring is visually indicated.

It will be noted from FIG. 7 that the coil spring 50, and which is associated with the inner arm 15, is somewhat longer and heavier than the coil spring 74 which is associated with the outer arm 16. This is desirable, since the inner arm must compensate not only for its own weight, but also for the weight of the outer arm and the workpiece.

Viewing FIG. 11, it will be seen that in the solid line position, the mounting pin 56 of the crank arm 22c is aligned along a line extending between the central axis B and the tangent to the pulley 55 defined by the chain 58. Thus the coil spring 50 imparts no torque to the drive unit 22 in the illustrated solid line position, and this position corresponds to the illustrated vertical upward position of the inner arm 15. In the dashed line position, the crank arm 22c has rotated 90° clockwise, and the inner arm 15 has rotated to a horizontal position, i.e. the position at which maximum torque will be applied to the drive unit 22 by the weight of the inner arm. At the dashed line position, a line extending between the mounting pin 56 and the central axis B is essentially perpendicular to the direction in which the force of the coil spring 50 is being applied through the chain 58, and by design, the resulting torque applied by the coil spring 50 to the crank arm 22c is sufficient to substantially offset the opposite torque applied by the weight of the arm. As will also be apparent, the torque applied by the coil spring 50 to the crank arm 22c will progressively increase during movement from the illustrated solid line position to the dashed line position, to effectively counterbalance the arm 15 in all intermediate positions. Also, the force will progressively decrease as the crank arm continues to rotate in the clockwise direction beyond the dashed line position, as the inner arm 15 moves toward a vertical downward position. A similar result will be achieved upon rotation in the counter clockwise direction from the illustrated solid line position.

Viewing FIG. 12, it will be seen that in the solid line position, the mounting pin 86 of the crank arm 23c is aligned along a line extending between the central axis B and the tangent to the pulley 84 defined by the chain 88. Also, the outer arm 16 is in a vertical orientation, such that it imparts no torque to the drive unit 23. When the outer arm 16 is rotated to the horizontal position illustrated in dashed lines, where maximum torque is applied by the weight of the arm 16, the crank arm 23c is rotated 90° as shown in dashed lines, so that the coil spring 74 imparts maximum counterbalancing torque to the crank arm 23c. Thus both the inner and outer arms are effectively counterbalanced throughout the full range of movements.

In the drawings and specification, there has been set forth a preferred embodiment of the invention, and although specific terms are employed, they are used in a generic and descriptive sense only and not for purposes of limitation.

That which is claimed is:

1. An industrial robot comprising
   a support member,
   a reversible drive unit mounted to said support member and including rotatable output shaft means an arm connected to said output shaft means of said drive unit so as to be rotatable about a horizontal axis at least between a vertically disposed position and a horizontally disposed position by operation of said drive unit, characterized by torsion spring means for applying a torque to said output shaft means in an amount which is a function of the rotational position of said arm and such that a minimum torque is applied when said arm is vertically disposed and a maximum torque is applied when the arm is horizontally disposed and so as to effectively counterbalance the weight of the arm, said torsion spring means including a coil spring having a plurality of windings and first and second opposite ends, means fixedly interconnecting said first end to said support member, and means interconnecting said second end to said output shaft means such that rotation of said output shaft means causes said second end of said coil spring to rotate so as to either tighten or loosen said windings of the coil spring, and said means fixedly interconnecting said first end of said coil spring to said support member includes torque adjustment means for selectively rotating said first end of said coil spring to thereby change the number of windings thereof and adjust the magnitude of the torque applied to said output shaft means, said torque adjustment means comprising a gear coaxially fixed to said first end of said coil spring, and a worm rotatably mounted to said support member and operatively engaging said gear, such that rotation of said worm acts to rotate said gear to either tighten or loosen said windings of said coil spring.

2. The industrial robot as defined in claim 1 wherein said coil spring and said output shaft means are mounted along parallel axes, and said means interconnecting said second end of said coil spring to said output shaft means comprises a pulley coaxially mounted to said second end of said spring, a crank arm coaxially mounted to said output shaft means, and cable means having one end wrapped upon said pulley and an opposite end fixed to said crank arm at a location radially spaced from the axis of said crank arm and output shaft means.

3. An industrial robot comprising a support member, first and second reversible drive units mounted to said support member, with said drive units including respective rotatable output shaft means which are coaxially disposed to define a horizontal central axis, an inner arm connected to said output shaft means of said first drive unit so as to be rotatable about said central axis at least between a vertically disposed position and a horizontally disposed position by operation of said first drive unit, an outer arm, means pivotally connecting said outer arm to said inner arm for relative movement about a horizontal second axis disposed parallel to and laterally spaced from said central axis, and torque transmission means operatively connecting said output shaft means of said second drive unit to said outer arm and whereby said outer arm may be rotated about said second axis by said second drive unit at least between a vertically disposed position and a horizontally disposed position, first torsion spring means operatively connected to said output shaft means of said first drive unit for applying a torque to said output shaft means of said first drive unit in an amount which is a function of the rotational position of said inner arm and such that a minimum torque is applied when said inner arm is vertically disposed and a maximum torque is applied when said inner arm is horizontally disposed and so as to effectively counterbalance the weight of said inner arm, second torsion spring means for applying a torque to said output shaft means of said second drive unit in an amount which is a function of the rotational position of said outer arm and such that a minimum torque is applied when said outer arm is vertically disposed and a maximum torque is applied when said outer arm is horizontally disposed and so as to effectively counterbalance the weight of said outer arm, each of said first and second torsion spring means comprising a coil spring having a plurality of windings and first and second opposite ends, means fixedly interconnecting each of said first ends to said support member and means interconnecting each of said second ends to the associated output shaft means such that rotation of each output shaft means causes said second end of the associated coil spring to rotate and thereby either tighten or loosen said windings thereof, with said means fixedly interconnecting each of said first ends to said support member including torque adjustment means for selectively rotating said first end of each said coil spring to thereby adjust the magnitude of the torque applied to each said output shaft means.

4. The industrial robot as defined in claim 3 wherein said output shaft means of said first drive unit is tubular, and said output shaft means of said second drive unit extends coaxially through said tubular output shaft means of said first drive unit.

5. The industrial robot as defined in claim 4 wherein said coil springs of said first and second torsion spring means are mounted along parallel horizontal axes which are parallel to said central axis.

6. The industrial robot as defined in claim 5 wherein said torque adjustment means comprises a gear coaxially fixed to each first end, a pair of worms rotatably mounted to said support member and operatively engaging respective ones of said gears, and such that rotation of each worm acts to rotate the associated gear and either tighten or loosen the windings of the associated coil spring.

7. The industrial robot as defined in claim 6 wherein said means interconnecting each of said second ends of said coil springs to the associated output shaft means comprises a pulley fixedly mounted to each of said second ends, a crank arm coaxially mounted to each of said output shaft means, and a pair of cable means each having one end wrapped upon one of said pulleys and an opposite end fixed to the associated crank arm at a location radially spaced from said central axis.

8. The industrial robot as defined in claim 7 further comprising a base, a third drive unit fixedly mounted to said base and having output shaft means disposed along a vertical axis, and means interconnecting said support member to said output shaft means of said third drive unit such that said support member may be selectively rotated about said vertical axis.

* * * * *

UNITED STATES PATENT AND TRADEMARK OFFICE
CERTIFICATE OF CORRECTION

PATENT NO. : 4,768,918

DATED : September 6, 1988

INVENTOR(S) : Gorman et al.

It is certified that error appears in the above-identified patent and that said Letters Patent is hereby corrected as shown below:

In column 4, line 4, change "21d" to -- 23d --.

Signed and Sealed this

Tenth Day of January, 1989

Attest:

DONALD J. QUIGG

*Attesting Officer*       *Commissioner of Patents and Trademarks*